United States Patent
Saori et al.

(10) Patent No.: US 7,528,882 B2
(45) Date of Patent: May 5, 2009

(54) IMAGE PICKUP APPARATUS

(75) Inventors: Masakazu Saori, Saitama (JP); Ryota Ogawa, Saitama (JP); Masahiro Oono, Saitama (JP)

(73) Assignee: Hoya Corporation, Tokyo (JP)

( * ) Notice: Subject to any disclaimer, the term of this patent is extended or adjusted under 35 U.S.C. 154(b) by 665 days.

(21) Appl. No.: 11/213,767

(22) Filed: Aug. 30, 2005

(65) Prior Publication Data
US 2006/0056063 A1  Mar. 16, 2006

(30) Foreign Application Priority Data
Aug. 31, 2004  (JP) .............................. 2004-253384

(51) Int. Cl.
H04N 5/225  (2006.01)
(52) U.S. Cl. ........................ 348/335; 348/349; 348/354
(58) Field of Classification Search ................. 348/344, 348/343, 369, 240.3, 240.2, 240.1, 335, 345; 396/60, 77; 359/354, 666, 691, 677, 676
See application file for complete search history.

(56) References Cited

U.S. PATENT DOCUMENTS

| 5,420,632 | A | * | 5/1995 | Yamagiwa | 348/240.3 |
| 5,479,295 | A | * | 12/1995 | Ohtake | 359/692 |
| 5,748,231 | A | * | 5/1998 | Park et al. | 348/207.99 |
| 6,169,635 | B1 | * | 1/2001 | Ozaki et al. | 359/691 |
| 6,204,880 | B1 | * | 3/2001 | Nishimura | 348/240.99 |
| 6,289,178 | B1 | * | 9/2001 | Kazami | 396/60 |
| 6,757,013 | B2 | * | 6/2004 | Matsuzaka | 348/240.1 |
| 6,853,808 | B1 | * | 2/2005 | Yasuda et al. | 396/72 |
| 7,092,020 | B2 | * | 8/2006 | Yoshikawa | 348/280 |
| 7,116,364 | B2 | * | 10/2006 | Battles et al. | 348/240.1 |
| 2005/0046711 | A1 | * | 3/2005 | Morimoto | 348/240.2 |

FOREIGN PATENT DOCUMENTS

| JP | 10-206732 | 8/1998 |
| JP | 2002-244030 | 8/2002 |

OTHER PUBLICATIONS

English Language Abstract of JP 2002-244030.
U.S. Appl. No. 11/213,768 to Saori, filed Aug. 30, 2005.

* cited by examiner

*Primary Examiner*—Ngoc-Yen T Vu
*Assistant Examiner*—Gary C Vieaux
(74) *Attorney, Agent, or Firm*—Greenblum & Bernstein, P.L.C.

(57) ABSTRACT

An image pickup apparatus includes a multifocal optical system having at least two different focal lengths; an image pickup device for converting an optical image formed by the multifocal optical system into an image signal; a first image processor for forming an original image defined by an object image at each focal length of the multifocal optical system with the image signal received from the image pickup device; and a second image processor for trimming the original image formed by the first image processor. An object image of an angle-of-view corresponding to an intermediate focal length between the two focal lengths of the multifocal optical system is complemented by a trimmed image formed by the second image processor.

4 Claims, 3 Drawing Sheets

IMAGE PICKUP APPARATUS

BACKGROUND OF THE INVENTION

1. Field of the Invention

The present invention relates to an image pickup apparatus mounted to a small information terminal or the like.

2. Description of the Related Art

In recent years, small camera modules have been mounted in compact portable data handsets such as cellular phones and PDAs (Personal Digital Assistant). An optical system for such a small camera module must be small and particularly thin. To this end, in many cases, a unifocal lens system is used for the optical system to reduce thickness and a trimming (digital zooming) function is used to achieve a zooming effect. According to this trimming function, virtual telescopic photography (enlargement photography) can be carried out by trimming the angle-of-view (image capture range). Alternatively, a thin optical zoom lens system which does not utilize a trimming function has been proposed. This known optical zoom lens system is provided with at least one movable lens group which is moved to change the focal length, to thereby vary the angle-of-view.

However, in a trimming system using a unifocal lens system, an optical image formed by the unifocal lens system is converted into a digital image (original image), so that at least a part of the digital image is extracted and enlarged in order to be displayed. Consequently, the enlarged digital image has fewer image pixels than that of the original image (original digital image which has not been enlarged). Therefore, after the extracted image is enlarged to the same size of the original image, the extracted image becomes undesirably rough. The image quality and the magnifying ratio for indicating an enlarged image are interrelated, so that the image quality is significantly reduced as the magnification is increased.

In a trimming system using an optical zoom lens, since it is necessary to provide a lens drive mechanism such as a motor or a cam in order to at least substantially continuously move the movable lens group, the lens drive mechanism tends to be complicated and large. An increase in the size of the optical zoom lens is contrary to the aim of miniaturizing and reducing the weight of the information terminal to which the optical zoom lens is to be mounted. Furthermore, in an optical zoom lens, the movement of the movable lens group significantly deteriorates the performance due to decentering (eccentricity) thereof or the like. In particular, such deterioration in the optical performance become more apparent as the optical zoom lens system is further miniaturized. In order to solve these problems, it is possible to use a bifocal optical system in which a wide-angle photographing mode and a telephoto mode can be selected. However, in a bifocal optical system, only two focal lengths can be selectively used, and hence, the bifocal optical system is not necessarily satisfactory for a zoom lens system.

SUMMARY OF THE INVENTION

The present invention eliminates the drawbacks of the above-described prior art by providing an image pickup apparatus which is simple in structure and which can prevent deterioration of the image quality, while providing a zooming effect substantially the same as that of an optical zoom lens system.

In the present invention, the mechanical structure and the lens structure are simplified by an appropriate combination of a bifocal optical system and a trimming (digital zoom) function, while providing the same zooming effect as a conventional optical zoom lens.

According to the present invention, an image pickup apparatus is provided, including a multifocal optical system having at least two different focal lengths; an image pickup device for converting an optical image formed by the multifocal optical system into an image signal; a first image processor for forming an original image defined by an object image at each focal length of the multifocal optical system with the image signal received from the image pickup device; and a second image processor for trimming the original image formed by the first image processor. An object image of an angle-of-view corresponding to an intermediate focal length between the two focal lengths of the multifocal optical system is complemented by a trimmed image formed by the second image processor.

The image pickup apparatus can include an angle-of-view setting device for changing and setting an angle-of-view, wherein the second image processor forms a trimmed image corresponding to a set angle-of-view set by the angle-of-view setting device based on the original image formed by the first image processor at a focal length smaller than, and closest to, a focal length of the multifocal optical system which corresponds to the set angle-of-view.

According to the above-described construction, the image quality of the trimmed image is less deteriorated.

It is desirable for the multifocal optical system to include a bifocal optical system which can switch between two different focal lengths.

The bifocal optical system provides a simpler lens construction and simplifies the surrounding mechanism thereof.

If the multifocal optical system is a bifocal optical system, it is desirable for the bifocal optical system to include at least one immovable lens group and a movable lens group which is movable relative to the immovable lens group.

In order to enhance the switching precision of the focal length, it is desirable for the image pickup apparatus to include two restriction devices which restrict the movement of the movable lens group at the short focal length extremity and the long focal length extremity, respectively, wherein the two different focal lengths of the bifocal optical system are attained by abutting the movable lens group against the two restriction devices, respectively.

It is desirable for the following condition to be satisfied:

$$1.0 < Dm < f2/f1 \qquad (1);$$

wherein Dm designates the trimming ratio of the image trimmed by the second image processor and the original image; f1 designates a short focal length of the bifocal optical system; and f2 designates a long focal length of the bifocal optical system.

If the value of Dm exceeds the upper limit in condition (1), the image quality is unacceptably deteriorated due to trimming. If Dm is smaller than the lower limit in the condition (1), no sufficient zoom ratio can be obtained. If the relationship defined by the condition (1) is satisfied, it is possible to minimize a deterioration of the image quality due to trimming while providing a sufficient zoom ratio.

It is desirable for the following condition (2) to be satisfied:

$$f3 = Dm*f2 \qquad (2);$$

wherein f3 designates the maximum focal length at which the trimmed image, trimmed at a maximum trimming ratio, is obtained by the second image processor, with respect to the long focal length f2.

If the value of f3 meets the requirement defined by the condition (2), an optical system having a zoom ratio represented by trimming ratio Dm*(f2/f1) can be obtained wherein deterioration of the image quality due to trimming is restricted.

The present disclosure relates to subject matter contained in Japanese Patent Application No. 2004-253384 (filed on Aug. 31, 2004) which is expressly incorporated herein in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
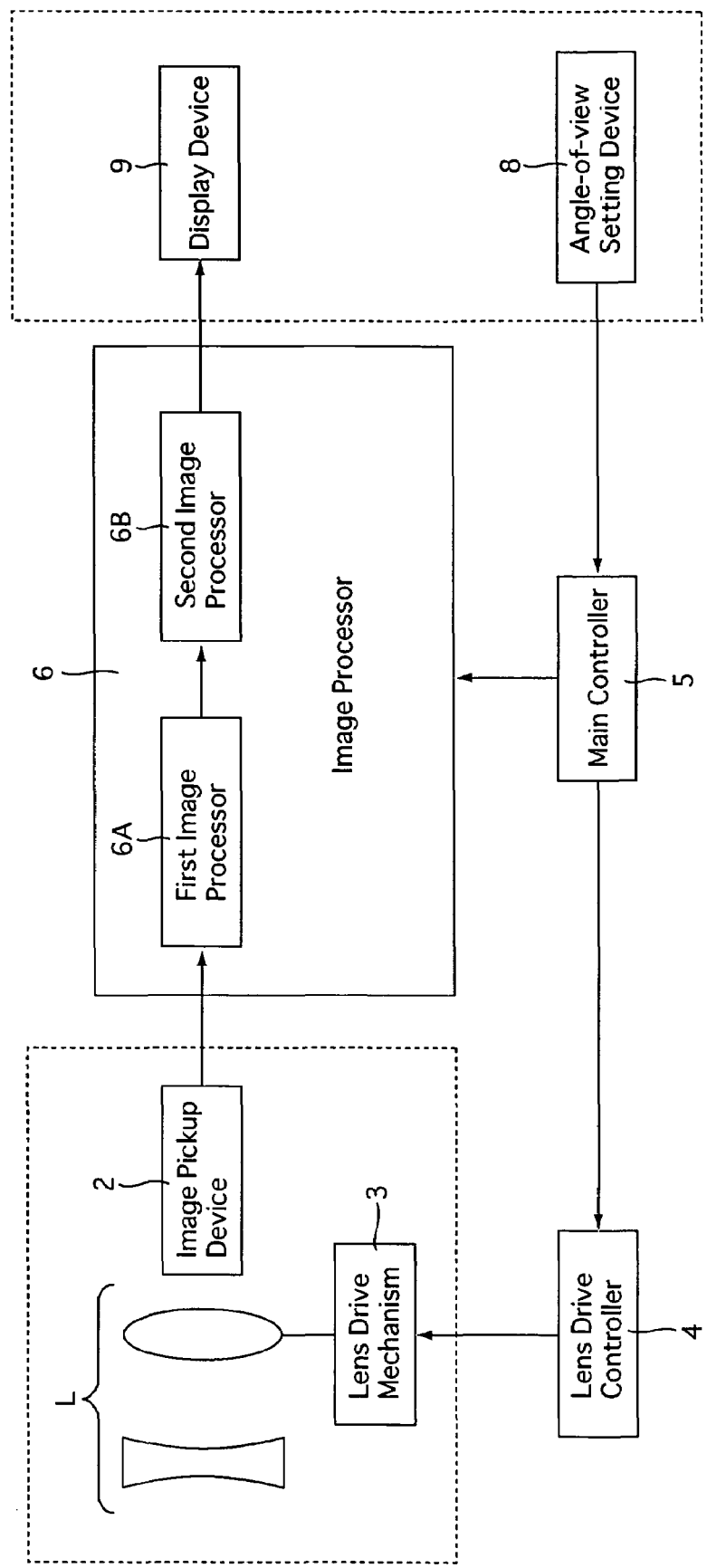
FIG. 1 is a block diagram of main components of an image pickup apparatus according to an embodiment of the present invention.

FIG. 1 shows a block diagram of main components of an image pickup apparatus according an embodiment of the present invention. The image pickup apparatus of this embodiment includes a multifocal optical system L, an image pickup device (CCD) 2, a lens drive mechanism 3, a lens drive controller 4, a main controller 5, an image processor 6, an angle-of-view setting device 8 and a display device (image monitor) 9.

Figure 2:
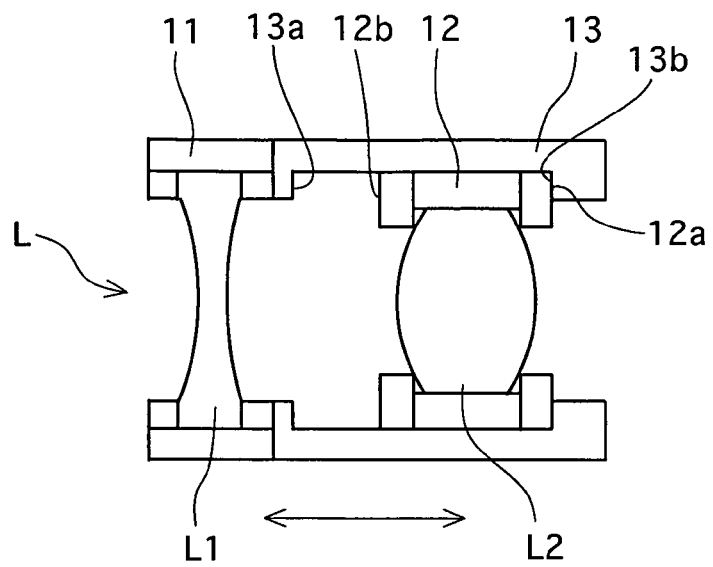
FIG. 2 is a schematic view of a multifocal optical system shown in FIG. 1.

The multifocal optical system L is in the form of a bifocal lens having two variable different focal lengths f1 and f2 and includes at least one immovable lens group L1 and a movable lens group L2 which is movable relative to the immovable lens group L1, in that order from the object side, as shown in FIG. 2. The immovable lens group L1 is supported by a support frame 11 secured in the apparatus. The movable lens group L2 is supported by a support frame 12 held by the stationary frame 13. The stationary frame 13 is secured to the support frame 11 which supports the immovable lens group L1. The stationary frame 13 is provided with a guide groove (not shown) formed in the inner surface thereof, so that the support frame 12 and the movable lens group L2 can be supported in the guide groove so as to move in a direction of the optical axis of the immovable lens group L1. Although the support frame 11 and the stationary frame 13 are made of separate components in the illustrated embodiment, it is possible to integrally form the support frame 11 and the stationary frame 13 together. If the support frame 11 and the stationary frame 13 are integrally formed together, assembling error can be reduced.

The movable lens group L2 is moved in accordance with the drive force of the lens drive mechanism 3 between a short focal length extremity fs (wide angle extremity) in which the movable lens group L2 is far away from the immovable lens group L1 and one end 12a of the support frame 12 abuts against a short focal length end (restriction device) 13a of the stationary frame 13 (as shown in FIG. 2), and a long focal length extremity ft (telephoto extremity), in which the movable lens group L2 is moved close to the immovable lens group L1 and the other end 12b of the support frame 12 abuts against a long focal length end (restriction device) 13b of the stationary frame 13. The movement of the movable lens group L2 is restricted when the support frame 12 abuts against the stationary frame 13. The movable lens group L2 can be precisely positioned at the telephoto extremity ft and the wide angle extremity fs. Consequently, it is possible to prevent deterioration in optical performance caused by decentering (eccentricity), etc. Thus, the focal lengths f1 and f2 of the multifocal optical system L can be selected with high precision. The focal lengths f1 and f2 of the multifocal optical system L correspond to the angle-of-views $\theta 1$ and $\theta 2$, respectively. Consequently, the angle-of-view $\theta 1$ is determined by the focal length f1 of the multifocal optical system L and the angle-of-view $\theta 2$ is determined by the focal length f2, respectively.

The image pickup device 2 converts an optical image of an object formed by the multifocal optical system L into a digital image and outputs the corresponding image signal to the image processor 6. The image processor 6 includes a first image processor 6A and a second image processor 6B. The first image processor 6A receives the image signal from the image pickup device 2, carries out the image processing operations and produces an object image which can be displayed in the display device 9. The second image processor 6B trims the object image formed by the first image processor 6A. In other words, the second image processor 6B constitutes a trimming circuit (digital zoom circuit). The angle-of-view setting device 8 constitutes an operation member which is actuated by an operator to switch and set the angle-of-view $\theta$. The angle-of-view setting device 8 is connected to the main controller 5.

Figure 3:
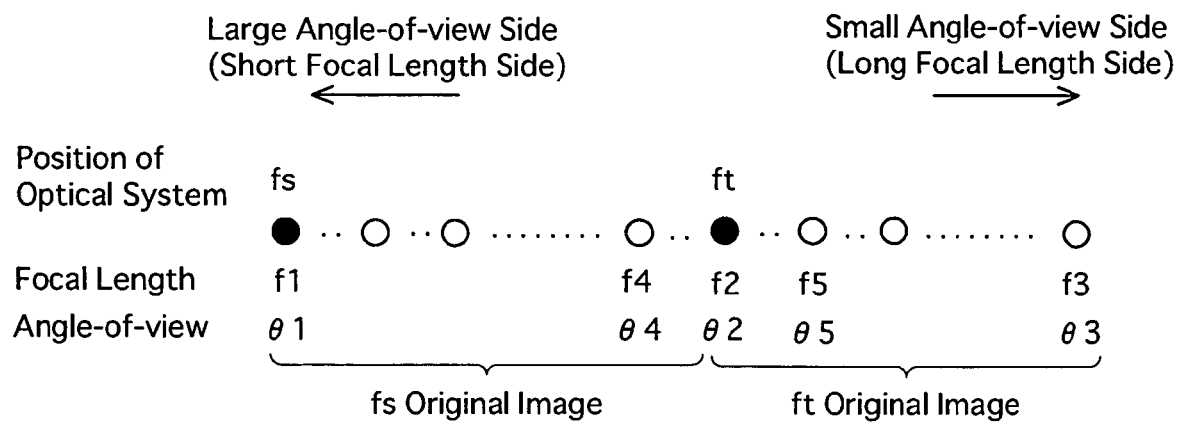
FIG. 3 is a conceptual view of an optical zooming operation and a trimming (digital zoom) operation in combination.

The main controller 5 operates the image pickup device 2, the lens drive controller 4 and the image processor 6 so as to obtain an object image of a angle-of-view $\theta$ set by the angle-of-view setting device 8. FIG. 3 schematically shows a relationship between the focal lengths f (f1 through f5) corresponding to the angle-of-views ($\theta 1$ through $\theta 5$) and the object images obtained at the respective focal lengths f1 through f5. In FIG. 3, the focal lengths f1 and f2 indicated by black circles represent the short focal length and the long focal length of the multifocal optical system L, respectively. At the focal lengths f1 and f2, the movable lens group L2 of the multifocal optical system L is located at the short focal length extremity fs and the long focal length extremity ft, respectively. The focal lengths f3, f4 and f5 indicated by white circles represent examples of the digital zoom positions at which the trimmed images formed by the second image processor 6B are obtained as object images (f1<f4<f2<f5<f3). The focal length f3 represents the maximum zoom position at which the object image trimmed at the maximum trimming ratio is obtained by the second image processor 6B.

As can be understood from the foregoing, the optical image formed by the multifocal optical system L is converted into a digital image (image signal) by the image pickup device 2, and is thereafter processed by the first image processor 6A so that the object image can be displayed in the display device 9. If the angle-of-views $\theta 1$ and $\theta 2$ corresponding to the short focal length f1 and the long focal length f2 of the multifocal optical system L are set by the angle-of-view setting device 8, the main controller 5 outputs the object image obtained in the first image processor 6A to the display device 9 in the same state as the original image without trimming the object image by the second image processor 6B. Consequently, the object image (without being trimmed) corresponding to an optical image formed by the multifocal optical system L is displayed in the display device 9. If, for example, the angle-of-view $\theta 4$ corresponding to the intermediate focal length f4 between the short focal length f1 and the long focal length f2 of the multifocal optical system L is set by the angle-of-view setting device 8, the object image obtained in the first image processor 6A is trimmed corresponding to the angle-of-view θ4 in the second image processor 6B. Consequently, the trimmed object image (digital zoom image) is displayed in the display device 9. Likewise, if the angle-of-view θ3 or θ5 corresponding to the focal length f3 or f5 which are longer than the long focal length f2 of the multifocal optical system L is set by the angle-of-view setting device 8, the object image obtained in the first image processor 6A is trimmed corresponding to the angle-of-view θ3 or θ5 in the second image processor 6B. Consequently, the trimmed object image is displayed in the display device 9.

Condition (1) defines the appropriate range of the trimming ratio Dm of the trimmed image formed by the second image processor 6B with respect to the original image. The trimming ratio Dm is defined by Dm=(size of the original image/size of the trimmed image). If the value of Dm exceeds the upper limit in condition (1), the image quality is unacceptably deteriorated due to trimming. If Dm is smaller than the lower limit in condition (1), a sufficient zoom ratio cannot be obtained. If the relationship defined by condition (1) is satisfied, it is possible to minimize a deterioration of the image quality due to trimming while providing a sufficient zoom ratio. It is desirable for the trimming ratio Dm to be the $\frac{1}{2}^{th}$ power of the zoom ratio (f2/f1) of the multifocal optical system L.

Condition (2) defines the digital zoom position (long focal length f3) with respect to the long focal length f2 of the multifocal optical system L. In other words, the condition (2) defines the upper limit of the digital zoom position obtained when the object image of the multifocal optical system L at the long focal length f2 is used as the original image. If the value of long focal length f3 satisfies the requirement defined by condition (2), an optical system having a zoom ratio represented by the trimming ratio Dm*(f2/f1) can be obtained while deterioration of the image quality due to trimming is restricted. Accordingly, it is possible to reduce deterioration of the image quality by the amount corresponding to the square of (f2/f1), in comparison with the case in which the same zoom ratio Dm*(f2/f1) is obtained only by the trimming operation using a unifocal lens system.

Figure 4:
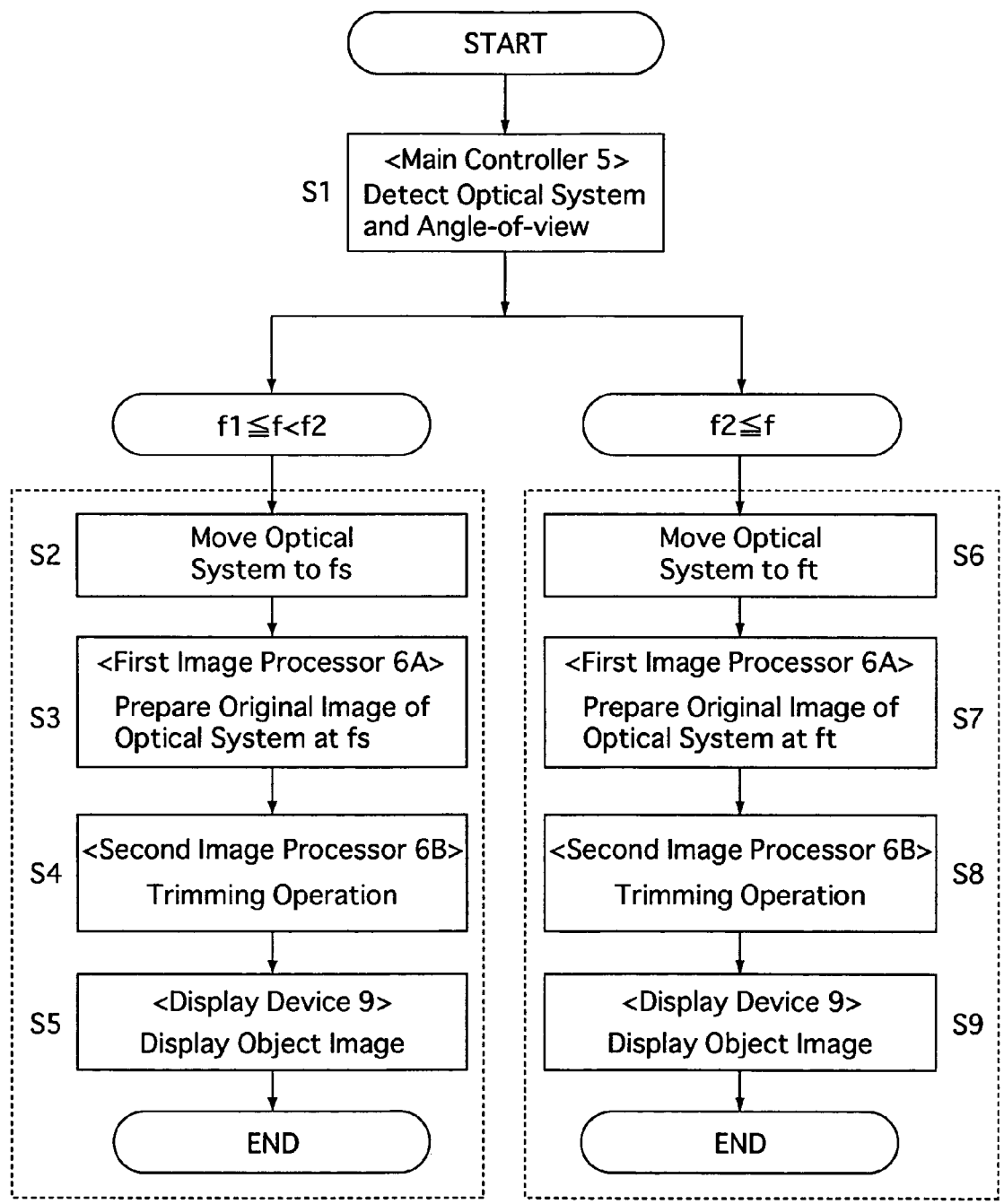
FIG. 4 is a flow chart of an operation of an image pickup apparatus shown in FIG. 1.

The operation of the image pickup apparatus of the present invention will be discussed below with reference to a flow chart shown in FIG. 4. The operation of the image pickup apparatus is controlled by the main controller 5. The main controller 5 detects the current position of the movable lens group L2 of the multifocal optical system L and the angle-of-view θ set by the angle-of-view setting device 8 (step S1) and performs a control corresponding to the set angle-of-view θ.

Firstly, it is assumed that the current angle-of-view θ set by the angle-of-view setting device 8 satisfies the condition θ1≦θ<θ2, namely, the current focal length f corresponding to the current angle-of-view θ satisfies the condition f1≦f<f2.

Accordingly, the main controller 5 moves the movable lens group L2 of the multifocal optical system L to the short focal length extremity fs via the lens drive controller 4 and the lens drive mechanism 3 (step S2). Since the movement of the movable lens group L2 is restricted when the support frame 12 abuts against the stationary frame 13, the movable lens group L2 is precisely stopped at the short focal length extremity fs. If the current position of the movable lens group L2 of the multifocal optical system L detected at step S1 is identical to the short focal length extremity fs, the movable lens group L2 is not moved, and is maintained at the short focal length extremity fs. Thereafter, the main controller 5 causes the image pickup device 2 to convert an optical image formed by the multifocal optical system L into a digital image and causes the first image processor 6A to processes the output signal (image signal corresponding the digital image) of the image pickup device 2 (step S3). Thereafter, the main controller 5 causes the second image processor 6B to carry out the trimming operation corresponding to the set angle-of-view θ (step S4). If the set angle-of-view θ satisfies the condition θ1<θ<θ2, the second image processor 6B trims the object image formed by the first image processor 6A and the trimmed image corresponding to the angle-of-view θ is output to the display device 9. If the set angle-of-view θ is identical to θ1, trimming is not carried out, and the object image formed by the first image processor 6A is output to the display device 9. Thus, the object image of the angle-of-view θ is displayed in the display device 9 (step S5).

If the current angle-of-view θ set by the angle-of-view setting device 8 satisfies the condition θ≧θ2; i.e., if the focal length f corresponding to the current angle-of-view θ satisfies the condition f≧f2, the apparatus operates in the following described manner.

Namely, the main controller 5 moves the movable lens group L2 of the multifocal optical system L to the long focal length extremity ft via the lens drive controller 4 and the lens drive mechanism 3 (step S6). Since the movement of the movable lens group L2 is restricted when the support frame 12 abuts against the stationary frame 13, the movable lens group L2 is precisely stopped at the long focal length extremity ft. If the current position of the movable lens group L2 of the multifocal optical system L detected at step S1 is identical to the long focal length extremity ft, the movable lens group L2 is not moved and is maintained at the long focal length extremity ft. Thereafter, the main controller 5 causes the image pickup device 2 to convert an optical image formed by the multifocal optical system L into a digital image, and causes the first image processor 6A to process the output signal (image signal corresponding the digital image) of the image pickup device 2 (step S7). Thereafter, the main controller 5 causes the second image processor 6B to carry out the trimming operation corresponding to the set angle-of-view θ (step S8). If the set angle-of-view θ satisfies the condition θ>θ2, the second image processor 6B trims the object image formed by the first image processor 6A and the trimmed image corresponding to the angle-of-view θ is output to the display device 9. If the set angle-of-view θ is identical to θ2, no trimming is carried out, and the object image formed by the first image processor 6A is output to the display device 9. Thus, the object image of the angle-of-view θ is displayed in the display device 9 (step S9).

As can be understood from the above discussion, according to the present invention, the optical image formed by the multifocal optical system L and the trimmed image formed by the image processor 6 are combined, and the object image at a focal length between the focal lengths f1 and f2 of the multifocal optical system L is complemented by the trimmed image. Therefore, the lens structure of the multifocal optical system L and the mechanical structure of the surroundings thereof can be simplified while substantially providing the same zoom effect as that of the conventional optical zoom lens. Moreover, the apparatus can be made small and light.

In the illustrated embodiment, in the case of f1<f<f2, the trimmed image is formed based on the original image defined by the object image at the short focal length f1 of the multifocal optical system L, and in the case of f≧f2, the trimmed image is formed based on the original image defined by the object image at the long focal length f2 of the multifocal optical system L. Namely, the object image at a focal length of the multifocal optical system L which is shorter than and closest to the focal length f corresponding to the set angle-of-view θ is used as the original image to be trimmed. In this arrangement, in which the original image to be trimmed is obtained at each focal length of the multifocal optical system L and the original image used for the trimming operation is selected in accordance with the angle-of-view θ set by the angle-of-view setting device 8, the image quality is deteriorated less due to the trimming operation, compared with the trimming operation being performed using a unifocal lens system.

Although a bifocal lens having two different variable focal lengths is used for the multifocal optical system L in the illustrated embodiment, it is possible to use a multifocal optical system having three or more different focal lengths. If a bifocal lens is used as in the illustrated embodiment, the lens structure and the surrounding mechanism thereof (drive system, etc.) can be significantly simplified.

Furthermore, in a zoom lens system which includes a focal length range between the wide-angle extremity and the telephoto extremity which has an optically discontinuous portion (i.e., does not have a solution), the present invention can be applied so as to connect this discontinuous portion to provide a continuous zooming path.

Obvious changes may be made in the specific embodiments of the present invention described herein, such modifications being within the spirit and scope of the invention claimed. It is indicated that all matter contained herein is illustrative and does not limit the scope of the present invention.

What is claim is:

1. An image pickup apparatus comprising:
   a multifocal optical system that switches between at least two different focal lengths;
   an image pickup device that converts an optical image formed by said multifocal optical system into an image signal;
   a first image processor that forms an original image defined by an object image at each focal length of said multifocal optical system based on said image signal received from said image pickup device; and
   a second image processor that trims the original image when an object image has a focal length other than the focal lengths of the multifocal optical system,
   wherein a trimming ratio $D_m$, defined as a ratio of the image trimmed by said second image processor to the original image, satisfies the conditions $1.0 < D_m < f_2/f_1$ and $f_3 = D_m * f_2$,
   wherein $f_1$ is a short focal length of said multifocal optical system, $f_2$ is a long focal length of said multifocal optical system, and $f_3$ designates the maximum focal length at which said trimmed image, trimmed at a maximum trimming ratio, is obtained by said second image processor, with respect to said long focal length $f_2$.

2. The image pickup apparatus according to claim 1, further comprising an angle-of-view setting device for changing and setting an angle-of-view, wherein said second image processor forms a trimmed image corresponding to a set angle-of-view set by said angle-of-view setting device based on said original image formed by said first image processor at a focal length smaller than, and closest to, a focal length of said multifocal optical system which corresponds to said set angle-of-view.

3. The image pickup apparatus according to claim 1, wherein said multifocal optical system comprises at least one immovable lens group and a movable lens group which is movable relative to said immovable lens group.

4. The image pickup apparatus according to claim 3, further comprising two restriction devices which restrict the movement of the movable lens group at a short focal length extremity and a long focal length extremity, respectively, wherein two of said at least two different focal lengths of said multifocal optical system are attained by abutting the movable lens group against said two restriction devices, respectively.

* * * * *